United States Patent
Adams et al.

(10) Patent No.: US 8,659,908 B2
(45) Date of Patent: Feb. 25, 2014

(54) PROTECTIVE CIRCUIT BOARD COVER

(75) Inventors: Christian Adams, Yalaha, FL (US);
Matthew Kelley, Orlando, FL (US);
Patrick Nelson, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 237 days.

(21) Appl. No.: 12/904,872

(22) Filed: Oct. 14, 2010

(65) Prior Publication Data

US 2011/0090658 A1 Apr. 21, 2011

Related U.S. Application Data

(60) Provisional application No. 61/251,565, filed on Oct. 14, 2009, provisional application No. 61/348,156, filed on May 25, 2010.

(51) Int. Cl.
*H05K 1/16* (2006.01)
*H01L 23/00* (2006.01)

(52) U.S. Cl.
CPC .................................. *H01L 23/573* (2013.01)
USPC .......................................... 361/765; 361/818

(58) Field of Classification Search
CPC .................................................... H01L 23/573
USPC .......... 361/760–765, 792, 818; 174/250, 258, 174/520, 260–262; 257/788–790
See application file for complete search history.

(56) References Cited

U.S. PATENT DOCUMENTS

| | | | |
|---|---|---|---|
| 3,931,454 A | 1/1976 | Sprengling | |
| 5,268,566 A | 12/1993 | Wakaumi et al. | |
| 5,512,738 A | 4/1996 | Yuen | |
| 5,538,756 A | 7/1996 | Korleski et al. | |
| 5,597,979 A | 1/1997 | Courtney et al. | |
| 5,635,293 A | 6/1997 | Korleski et al. | |
| 5,759,625 A | 6/1998 | Laubacher et al. | |
| 5,847,650 A * | 12/1998 | Zhou et al. | 340/572.6 |
| 6,190,941 B1 | 2/2001 | Heinz et al. | |
| 6,203,912 B1 | 3/2001 | Watakabe et al. | |
| 6,233,339 B1 | 5/2001 | Kawano et al. | |
| 6,254,972 B1 | 7/2001 | Farquhar et al. | |
| 6,280,797 B1 | 8/2001 | Kuczynski et al. | |
| 6,421,013 B1 | 7/2002 | Chung | |
| 6,638,690 B1 | 10/2003 | Meier et al. | |
| 6,861,092 B2 * | 3/2005 | McCarthy et al. | 427/207.1 |
| 6,970,360 B2 | 11/2005 | Sinha | |
| 7,015,823 B1 * | 3/2006 | Gillen et al. | 340/652 |
| 7,037,580 B2 | 5/2006 | Razavi et al. | |

(Continued)

FOREIGN PATENT DOCUMENTS

| | | |
|---|---|---|
| CA | 2011205 | 8/1991 |
| EP | 0 079 589 A1 | 5/1983 |

(Continued)

*Primary Examiner* — Yuriy Semenenko

(74) *Attorney, Agent, or Firm* — Birch, Stewart, Kolasch & Birch, LLP

(57) ABSTRACT

A protective, anti-tamper coating and methods of coating creation and application are provided. The coating may include an elastomeric layer to allow for strippability/removal. The coating may also include a "smart layer" for tamper detection, imaging prevention, and tamper prevention or underlying device de-activation/alteration upon tamper detection. The coating may also include one or more ground planes around the smart layer and one or more frangible layers designed to interrupt or alter smart layer function in the event of a tamper attempt.

20 Claims, 15 Drawing Sheets

(56) References Cited

U.S. PATENT DOCUMENTS

| | | |
|---|---|---|
| 7,054,162 B2 | 5/2006 | Benson et al. |
| 7,173,323 B2 | 2/2007 | Wolters et al. |
| 7,175,876 B2 | 2/2007 | Free et al. |
| 7,180,008 B2 * | 2/2007 | Heitmann et al. ............ 174/261 |
| 7,214,889 B2 | 5/2007 | Mazurkiewicz |
| 7,274,289 B2 | 9/2007 | Kerr et al. |
| 7,383,999 B2 | 6/2008 | Bi et al. |
| 7,429,915 B2 | 9/2008 | Cruzado et al. |
| 7,513,437 B2 | 4/2009 | Douglas |
| 7,585,926 B2 | 9/2009 | Sato et al. |
| 2001/0050175 A1 | 12/2001 | Pulver |
| 2002/0171157 A1 | 11/2002 | Soga et al. |
| 2004/0155308 A1 | 8/2004 | McFadden et al. |
| 2004/0222014 A1 * | 11/2004 | Heffner ........................ 174/250 |
| 2006/0012969 A1 | 1/2006 | Bachman |
| 2007/0100043 A1 | 5/2007 | Shiono |
| 2007/0177363 A1 * | 8/2007 | Jayanetti ..................... 361/760 |
| 2008/0108767 A1 | 5/2008 | Sato et al. |
| 2009/0047797 A1 * | 2/2009 | Anderson et al. ............. 438/763 |
| 2009/0243065 A1 | 10/2009 | Sugino et al. |

FOREIGN PATENT DOCUMENTS

| | | |
|---|---|---|
| EP | 0 159 942 A2 | 10/1985 |
| EP | 0 248 617 A2 | 12/1987 |
| EP | 1 117 281 A1 | 7/2001 |
| EP | 1 918 339 A1 | 5/2008 |
| GB | 2 109 166 A | 5/1983 |
| JP | 60-107391 A | 6/1985 |
| JP | 2-50831 A | 2/1990 |
| JP | 2-50833 A | 2/1990 |
| JP | 3-277677 A | 12/1991 |
| JP | 9-203445 A | 8/1997 |
| JP | 10-88094 A | 4/1998 |
| WO | WO 03/026371 A1 | 3/2003 |
| WO | WO 2008/076473 A2 | 6/2008 |

* cited by examiner

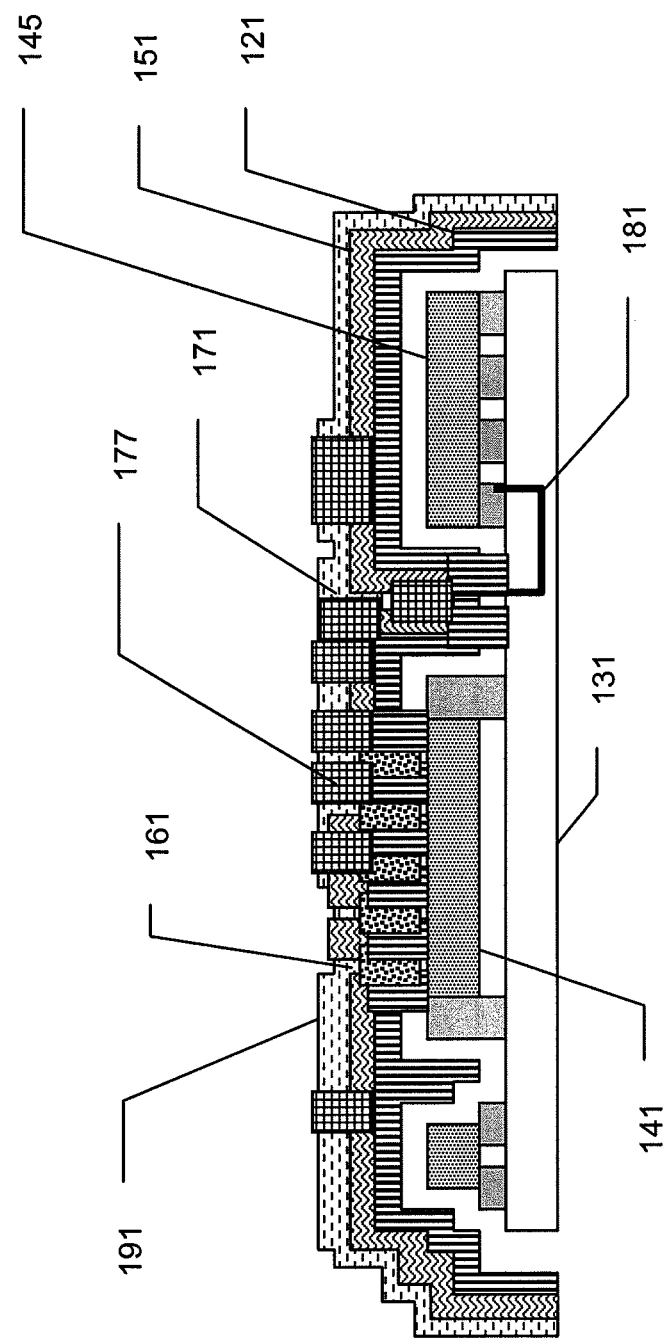

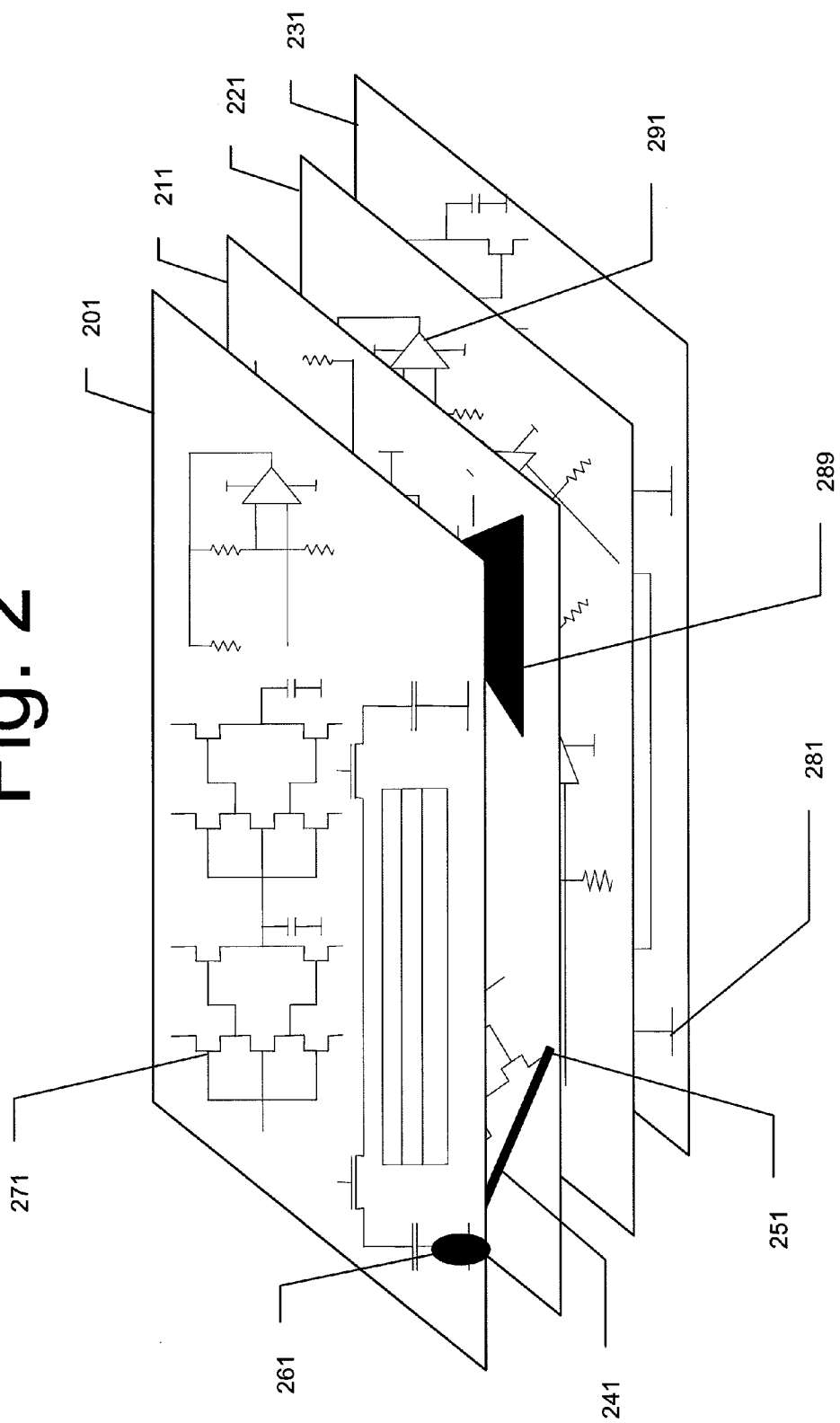

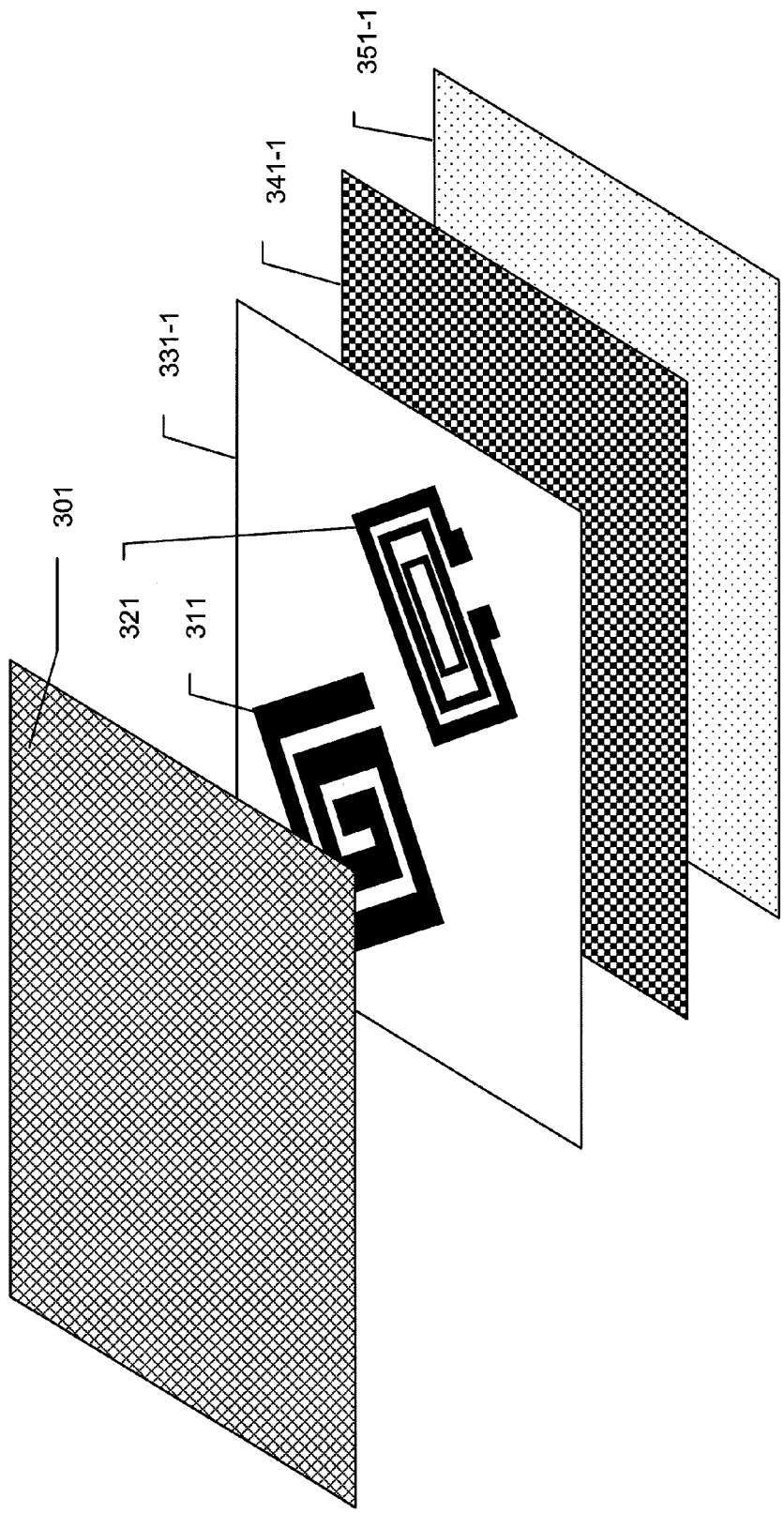

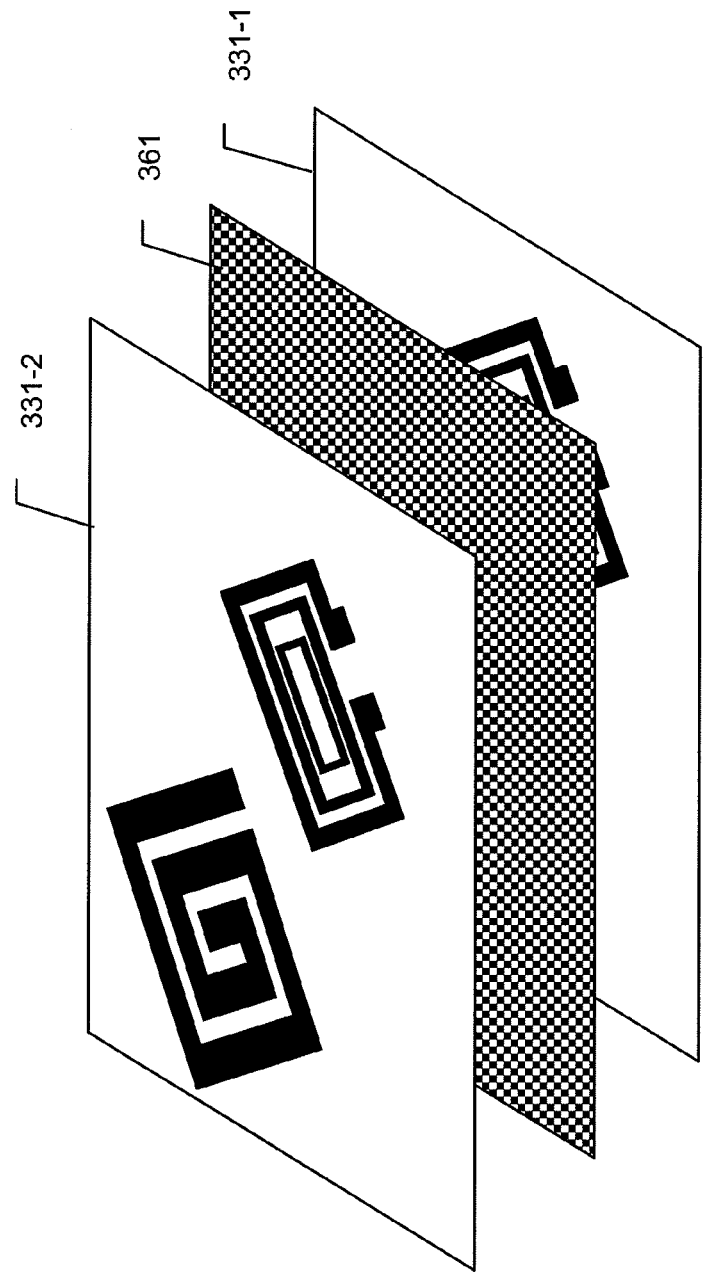

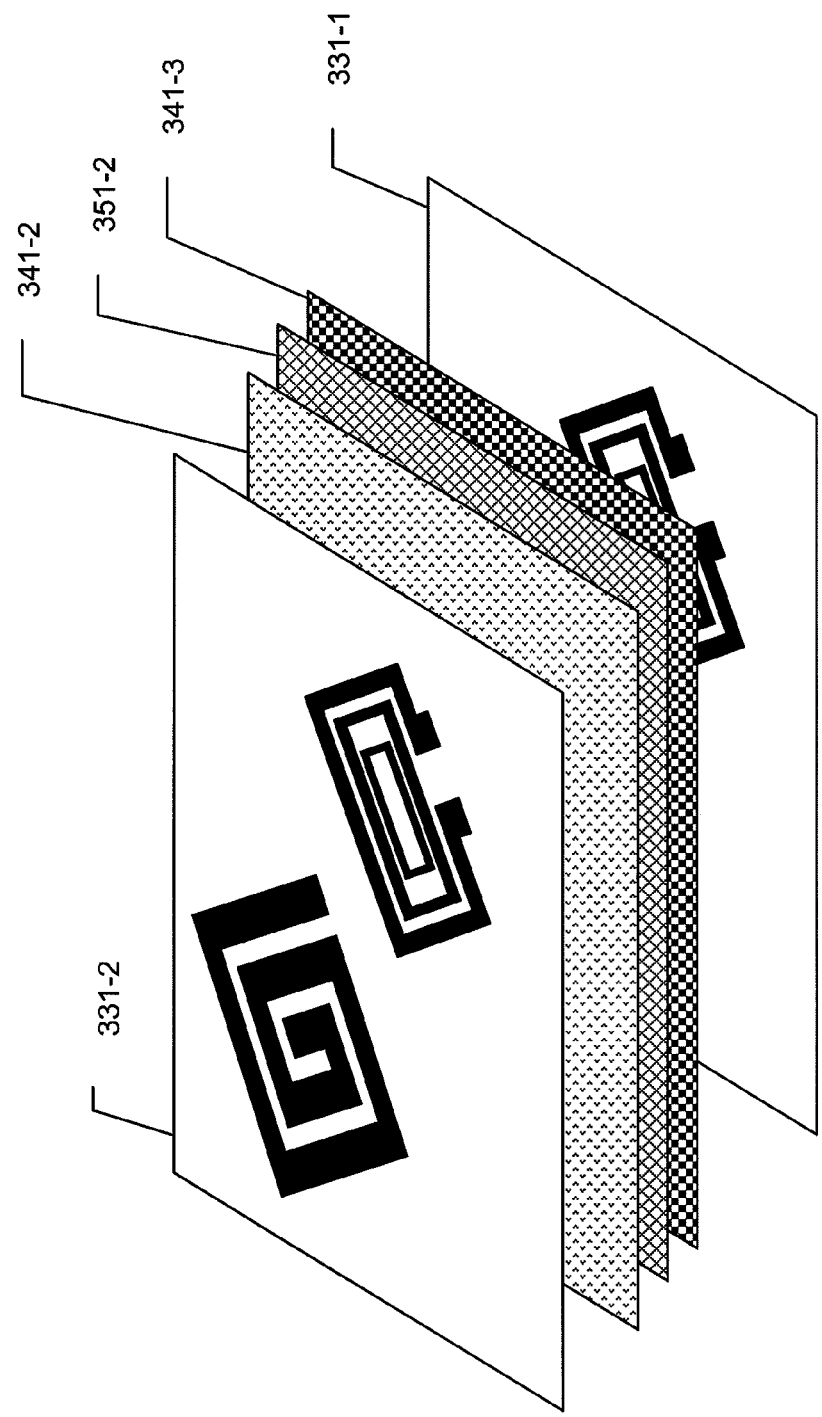

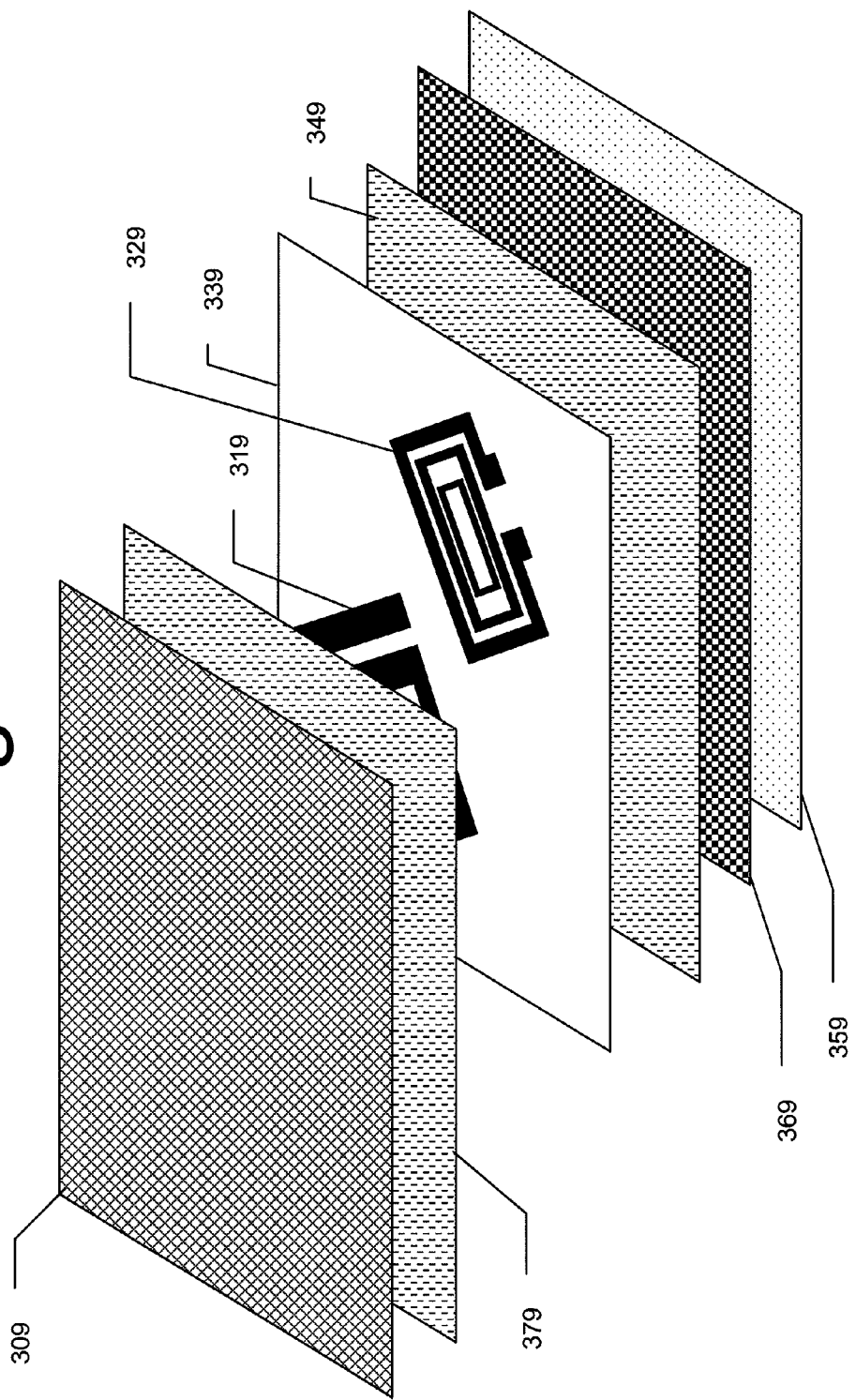

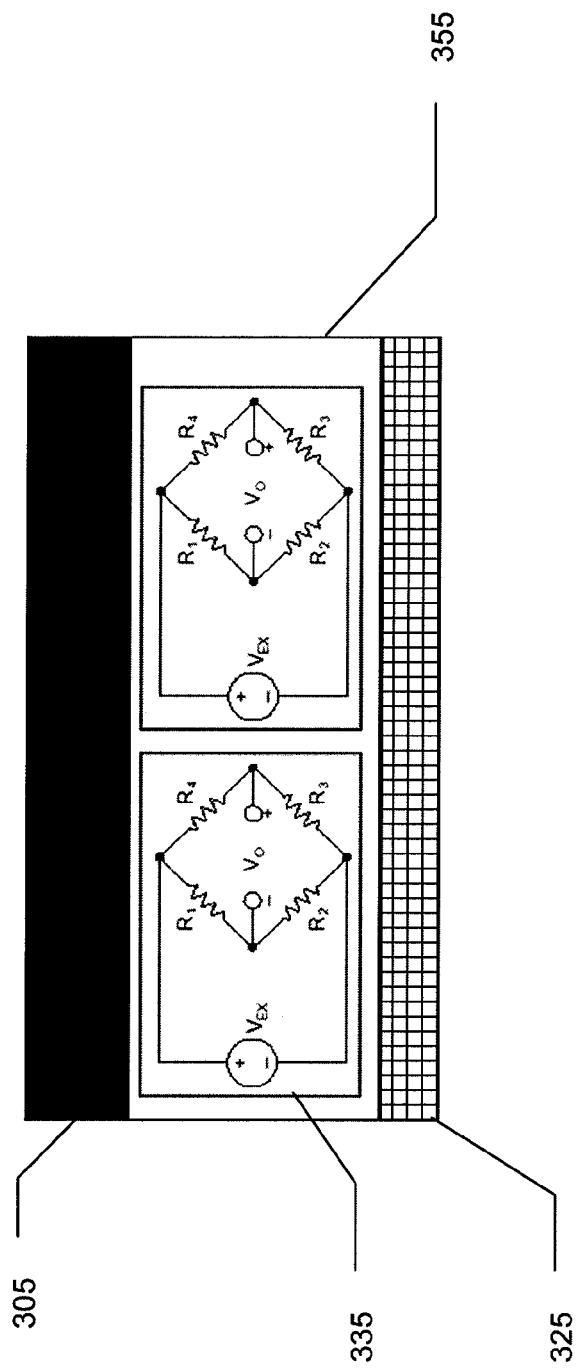

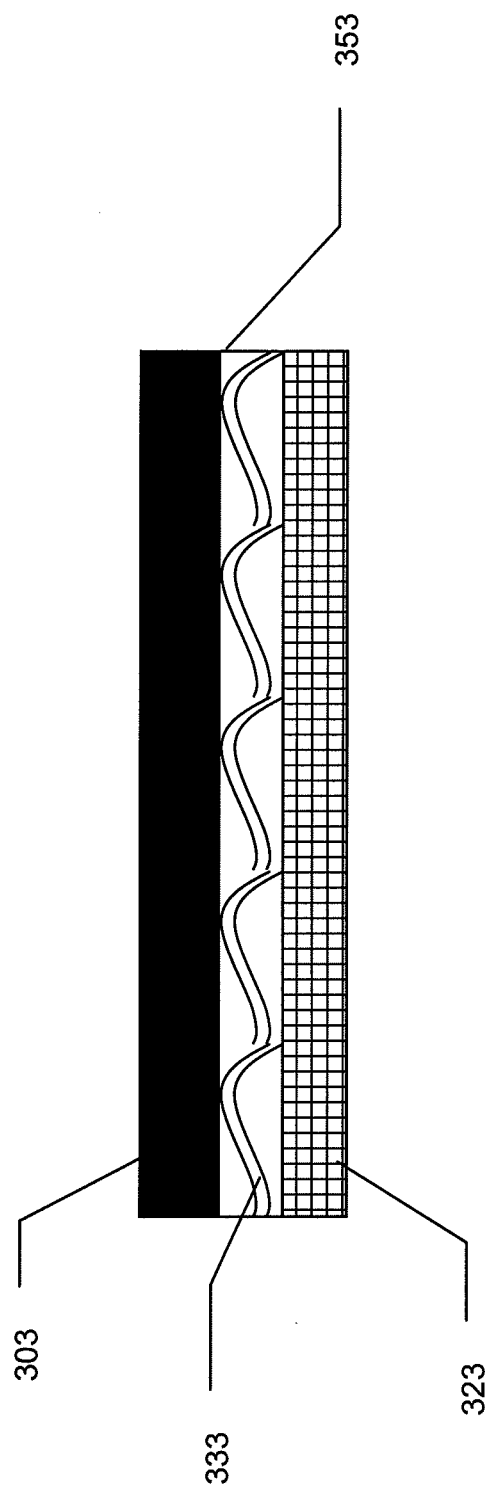

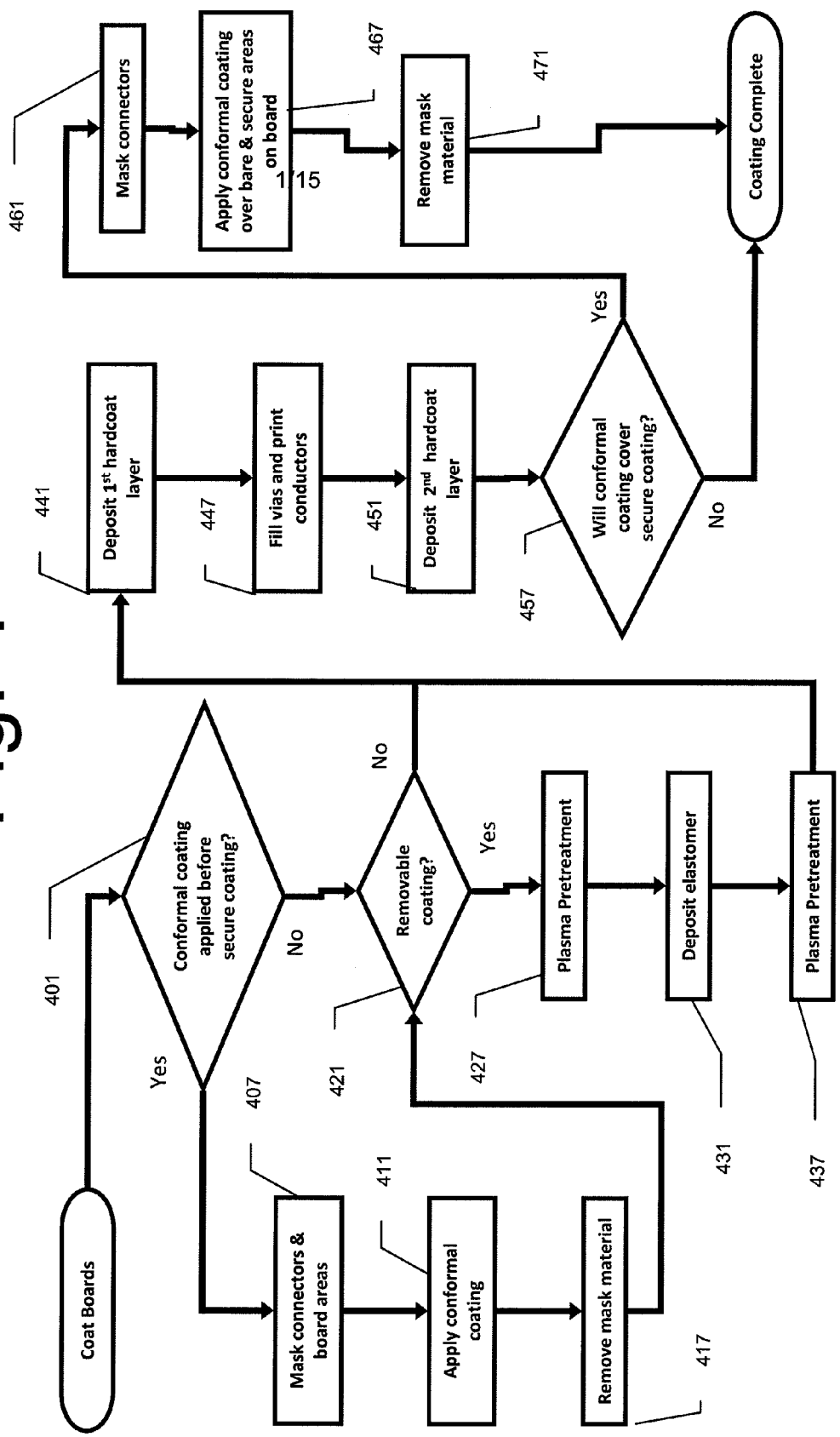

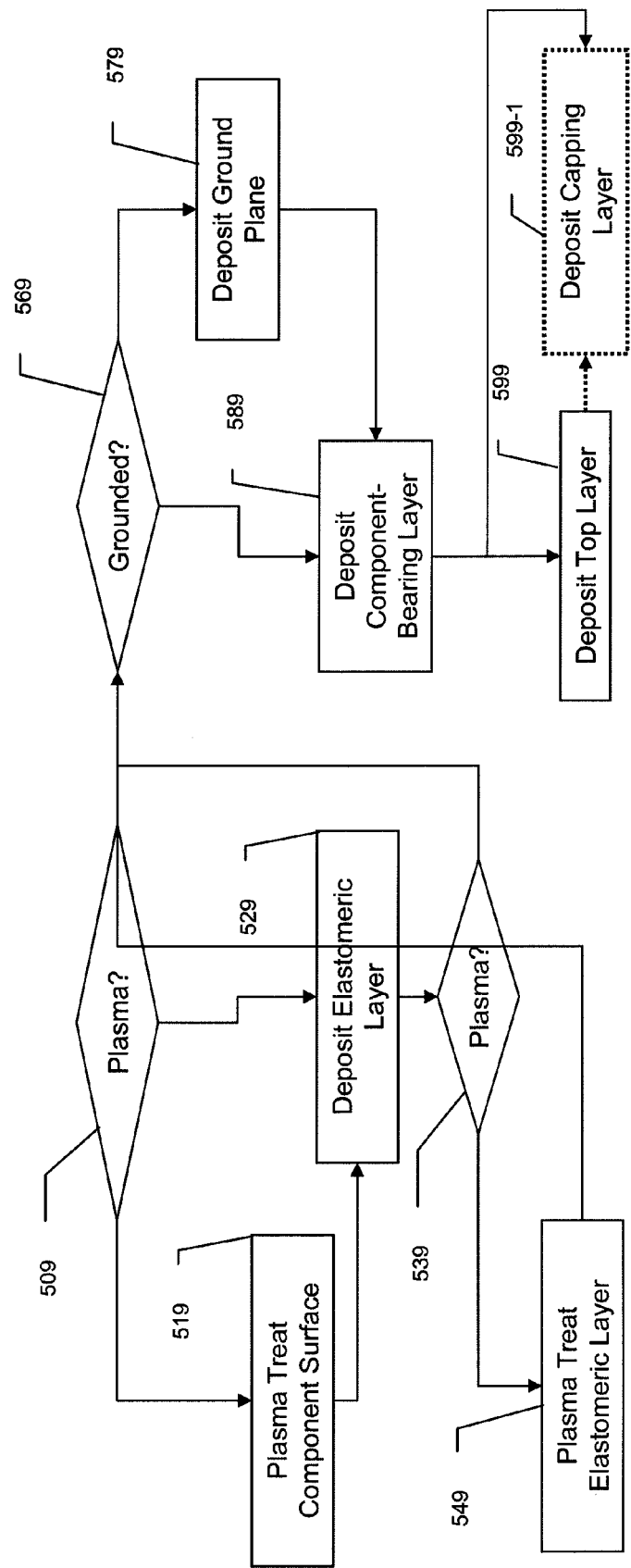

PROTECTIVE CIRCUIT BOARD COVER

The present invention claims benefit of priority to Provisional Application 61/251,565, filed in the U.S. Patent and Trademark Office on Oct. 14, 2009, the entire contents of which are hereby incorporated by reference. The present invention also claims benefit of priority to Provisional Application 61/348,156, filed in the U.S. Patent and Trademark Office on May 25, 2010, the entire contents of which are hereby incorporated by reference.

TECHNICAL FIELD OF THE INVENTION

The present invention relates in general to anti-tamper solutions to prevent unauthorized access to and modification of components or information stored in electromagnetic (EM) domains (electronic, magnetic, or optical modules), components of a printed circuit or wiring board, or in integrated circuits, optical, magnetic, or other EM devices.

BACKGROUND OF THE INVENTION

Anti-tamper (AT) devices and techniques have long been used to protect and secure proprietary and secret products and information from discovery by either hacking or reverse engineering. AT techniques and reverse engineering techniques constantly develop in response to each other in an ever more complex and intricate interplay of security measures and counter-measures. One particular area where stronger anti-tamper techniques are desirable is in the development of secure, tamper-evident, tamper-sensitive, and tamper-respondent coatings for circuit components and other hardware.

Another area of interest related to anti-tamper techniques is masking or otherwise obscuring the actual component content, wiring or trace structure and layout of a circuit board, and/or intellectual property associated with the fabrication of an integrated circuit, thereby making it more difficult to unlock and reverse engineer a protected information storage or information processing system.

SUMMARY OF THE INVENTION

Aspects of the present disclosure are directed at providing coatings for tamper prevention, tamper detection, and data security of printed wiring boards, printed circuit boards, integrated circuits, similar EM pathway-based components and any enclosure or volume that is subject to forcible intrusion and/or penetration that might contain the aforementioned items.

Embodiments of the present invention pertain to multi-layer coatings with embedded EM pathways. Embodiments of such coatings may include one or more anti-tamper or protective hardcoat layers. Further embodiments may also include one or more elastomeric or pliant undercoat layers. In some embodiments, the undercoat may be configured for removal and re-application as part of a maintenance process. Embodiments of an elastomeric undercoat may permit removal and re-application of anti-tamper coatings to a protected component as part of a maintenance process or procedure.

Embodiments of coatings with embedded EM pathways may include circuit patterns or components designed to obscure the real nature of the components or wiring patterns coated thereby from imaging or other non-destructive testing and/or analysis techniques. Alternate embodiments may include material-based key containers for decoding or decryption of data stored in a circuit or component, for token-based authentication purposes, for organic key generation (OKG) applications, or for enabling access to coated circuit components. Further embodiments may be configured to ensure destruction or permanent damage to the key material due to tampering or other unauthorized access attempts. Yet further embodiments may be configured to inflict damage to protected circuitry or other active components or signal pathways during, or as a result of, a tamper event.

Further embodiments of coatings and coating layers may include ground planes disposed so as to electrically isolate one or more coating layers containing conductive pathways and/or active components from other such conductive/active layers and/or from any components on an underlying wiring board or flexible substrate, such as Kapton, polyimide, or liquid crystal polymer (LCP). Yet further embodiments may include electromagnetic shielding layers disposed as part of or in addition to any coating layers. Such shielding layers may include ground plane characteristics or may be separate shield layers. Further embodiments may include one or more layers of dielectric material disposed on top of a ground plane or a shielding layer, or may include a dielectric as part of a shielding layer. Yet further embodiments may combine ground plane, shielding, and/or dielectric properties into a hardcoat or elastomeric layer.

Embodiments of key material and material-based access control may include a power-on verification sequence that tests or looks for some known electrical or optical properties of a conductor or circuit element or reflective portion included in a protective coating. One particular embodiment may include multiple layers of electrically and/or optically conductive or magnetic components dispersed through multiple coating layers such that tampering or access attempts cause changes in the capacitance or impedance of the coating or otherwise lead to perturbations in a signal propagating through the coating or through components disposed therein.

A further embodiment may include an arrangement where tampering causes components or conductors in the coating to ground or short-circuit some or all of the components in the coated circuit portion(s). A further embodiment may include an arrangement where portions of the signal pathway of the protected circuit or circuit portion are included in a coating layer such that tampering or unauthorized access attempts destroy or alter a signal pathway, thereby disabling or modifying the circuit or circuit component or the operation or function thereof.

Embodiments of key material and material-based access control or tamper detection may also include component or conductive layers covered by one or more layers (such as a hardcoat or dielectric layer) having specific electrical properties, thereby further altering or affecting the conductive properties of signal pathways or circuit elements disposed therein. In some embodiments, these electrical properties may be affected by the frequency of an electrical current that it is in intimate contact with, which in turn affect the speed of the electrical propagation through said conductors according to this equation: $v=1/\sqrt{(\mu\varepsilon)}=c/\sqrt{(\mu_r\varepsilon_r)}$; where $\varepsilon_r$ is the dielectric constant and $\mu$ is the magnetic component.

Further embodiments of key material and material-based access control may be similar to those described in U.S. patent application Ser. No. 12/578,089, filed Oct. 13, 2009, the entire contents of which are hereby incorporated by reference. Yet further embodiments of key material and material-based access control may take the form of other sensors constructed by the deposition of electrical pathways and printable electrical components, such as oscillators, wheatstone bridges, physically unclonable functions (PUFs), electromagnetic devices, and/or RFID tags. In some embodiments, signal pathways or components may be embedded and/or constructed within the coatings, thereby forming an intra-coating network that would cease activity should the coating be violated. Even further embodiments may include chemical or magnetic sensors embedded in a coating or coating layer. In further embodiments still, any suitable sensor may be deposited or patterned on or within a layer as part of a coating or coating layer via an embodiment of a coating application or deposition process, allowing it to function as a security measure through challenge/response and/or key generation when the device is booted or activated. In such embodiments, tampering with a coating, no matter what the sensor consists of, may result in the destruction of the sensor and result in the denial of device boot or device operation or in some other desired tamper response.

Further embodiments of a protective hardcoat layer may be deposited on other hardcoat layers, directly on a circuit board or circuit component, or may be disposed on top of one or more layers of an elastomeric undercoat. Embodiments of an elastomeric undercoat for anti-tamper coatings may include a strippable embodiment that may be removed at depot for repairs or upgrades to the coated/protected component(s) and/or for replacement or upgrade of the anti-tamper coating itself. Further embodiments may be configured to mitigate or reduce material stresses in a circuit board or component or in a protective hardcoat due to cure-induced stress during thermosetting of polymer coatings or layers, and/or due to mismatches between the coefficient of thermal expansion (CTE) of a hardcoat layer and of the underlying circuit or circuit component protected thereby. Yet further embodiments may include chemically resistant fluoroelastomers or fluorosilicones to protect against chemical and/or environmental damage. Embodiments of elastomeric undercoats may be plasma treated to improve adhesion to a hardcoat, and may come in a wide range of viscosities, including variations as runny as water or as thick as tar. Yet further embodiments may include a plasma-treated coated surface, allowing for easier removal of an elastomeric layer for subsequent servicing, maintenance, and/or upgrade operations (upgrades to either the coated component(s) or to a protective coating).

In one variation of an anti-tamper coating for a component, the coating may include a foundation layer that includes thermal and component connection vias; a smart layer disposed on top of the foundation layer, the smart layer including at least one active circuit component or signal pathway operably connected to the underlying component through a connection via; and a capping layer disposed on top of the smart layer and configured with a frangible portion such that a tamper attempt breaks the frangible portion, thereby causing physical damage to underlying smart layer components or signal pathways.

In further variations, the foundation layer may include an elastomeric undercoat and the undercoat may include thermal and/or component connection vias. In yet further variations, the smart layer may include at least two sub-layers, each sub-layer including at least one active circuit component or signal pathway operably connected to at least one of an active circuit component or signal pathway in the other sub-layer. In yet further variations, the foundation layer may include a frangible portion such that breakage of the frangible portion causes disruptive or destructive interactions between a smart layer component or signal pathway and the underlying electric component.

Further variations may include a ground plane layer disposed between the foundation layer and the smart layer. In yet further variations, the capping layer may include an electromagnetic shielding portion. Further variations still may include a ground plane disposed between the smart layer and the capping layer.

In some variations, an active component aspects of a smart layer may include at least one of a logic device and a memory device. In further variations, the coating may include a first ground plane disposed between the smart layer and the foundation layer and a second ground plane disposed on top of the smart layer. In yet further variations, a second smart layer may be disposed between the second ground plane and the capping layer. In further variations still, the capping layer may include damage-causing elements contained in the frangible portion such that breaking the frangible portion makes the damage-causing elements physically interact with the smart layer.

Aspects of the present disclosure are also directed at methods of creating and applying anti-tamper coatings to circuit components. Embodiments of elastomeric undercoat deposition may include application processes that do not require photomasking. Yet further embodiments may include plasma treatment processes to vary the adhesive properties of an undercoat. Some embodiments of plasma treatment operations may be used to allow for easy removal of an undercoat for maintenance or upgrade operations on a protected circuit or circuit element. Further embodiments may be used to improve the adhesion of an undercoat to a hardcoat that may be applied over it.

An embodiment of a deposition process may include plasma activating a circuit board or circuit component or integrated circuit for decreased adhesion, deposition of an elastomeric undercoat, and plasma activation of the elastomeric undercoat for improved adhesion to a later-deposited hardcoat. Embodiments of a deposition process may include the creation of thermal vias and/or specialized vias that connect a circuit board or circuit component to components or material-based key storage portions of a protective hardcoat layer. Embodiments of an elastomeric undercoat deposition process may be CAD/CAM-based and/or may include automated "printing" processes for materials/coating deposition and/or sensor, component, signal pathway, and/or other feature deposition.

An embodiment of a deposition process for a protective multi-layer coating may include CAD/CAM-based deposition or automated "printing" of a first hardcoat layer. Deposition of a first hardcoat layer may include the creation of thermal vias and/or specialized vias that connect the circuit board or circuit component being coated with heat sinks or with tamper-sensitive components to be deposited over the first hardcoat layer. Further embodiments of a deposition process may include the filling of thermal vias and/or the deposition of conductive paths, "dummy" or masking components or signal pathways, material-based key storage portions, active circuit components, and other components or devices included in the protective hardcoat. Embodiments may also include a connection phase where certain components from the hardcoat layer are connected, by the created vias or interconnects, to the circuit board, circuit component, other components within the coating, or integrated circuit device being coated. Further embodiments may conclude with the deposition of a second hardcoat layer that seals and covers the conductive paths and components introduced into the hardcoat and connected to the underlying protected component(s).

Embodiments of a protective hardcoat deposition process may be coupled with an elastomeric undercoat deposition process or may be implemented without an attendant elastomeric undercoat. Embodiments may also include deposition of a pre-fabricated hardcoat already having tamper-sensitive, tamper-evident, and/or obfuscating components included therein. Such embodiments may be useful for systems or operating environments where hardcoats are routinely stripped and re-applied to circuit components or integrated circuits, as multiple, standardized hardcoat variants may be created in advance and removed or applied as part of a maintenance process without requiring disclosure of the hardcoat fabrication process.

Alternate embodiments may be accomplished through a single machine configured to print or deposit either only a hardcoat or a combination or hardcoat and elastomeric undercoat. Embodiments of such printing or deposition operations may be associated with one or more CAD/CAM files and/or with optical recognition or registration of a circuit board or circuit component. One embodiment of a coating application process is depicted below:

In the embodiment depicted above, a board or circuit component may be pre-treated with plasma to reduce adhesion, have an elastomeric softcoat deposited thereon, plasma treated to improve softcoat adhesion, have a foundation hardcoat deposited onto the softcoat, have a smart layer with conductive traces and thermal vias deposited onto the foundation hardcoat, and then have a frangible hardcoat capping layer applied over the smart layer. An embodiment of such a layer application process is depicted below:

In the above-depicted embodiments of a coating deposition process, a circuit board is plasma activated to reduce its adhesion to an elastomeric softcoat. This is done so that the elastomeric softcoat may be easily stripped from the board for maintenance, repair, or upgrade. The elastomeric softcoat is then plasma activated for increased adhesion between it and anything deposited on it. In some embodiments, the plasma treatment steps maybe omitted or replaced with other treatment steps. In further embodiments, the entire elastomeric softcoat portion maybe omitted, along with its attendant fabrication steps. Alternate embodiments may also deposit coatings on individual electronic components, optical components, circuit board assemblies, or integrated or composite functional modules that include a range of components and component types.

An embodiment of a deposition process for a tamper-resistant or tamper-evident hardcoat may be employed regardless of whether an elastomeric softcoat is first applied. An embodiment of a hardcoat deposition process for a board equipped with an elastomeric softcoat is shown below:

In the above-depicted embodiment, a first layer of hardcoat is applied on top of an elastomeric undercoat. In alternate embodiments, a first layer of hardcoat may be applied directly to a circuit board, individual electronic components, optical components, circuit board assemblies, or integrated or composite functional modules that include a range of components and component types. Embodiments using such direct hardcoat application may be accomplished with reduced cost and reduced manufacturing time, but may not allow for subsequent removal of the hardcoat for maintenance or repair work. Embodiments of a first hardcoat layer may be as frangible or plastic as required by a particular application. Embodiments deposited in concert with an elastomeric softcoat may be highly frangible whereas embodiments deposited without an elastomeric softcoat may be either frangible or plastic or some combination thereof depending on levels or nature of physical force or pressure a protected component is expected to experience or withstand without loss of function.

Embodiments of elastomeric or hardcoat layer deposition processes may include requirements to arrange underlying components on a rigid or flexible substrate to reduce or minimize a z-direction footprint. Embodiments of underlying boards or flexprints may be configured to as not to have tall components close together or to have them disposed in a fashion that reduces their apparent height. Yet further embodiments may employ gap-filling strategies of applying filler material to gaps between components where an elastomeric or hardcoat layer may otherwise be unable to provide continuous coating due to obstacles such as deep, narrow gaps between components.

After depositing the first hardcoat layer, the deposition process proceeds to the application of a ground plane and/or a "smart layer." A ground plane may include a metallization layer or may itself be a metal or metallic layer or may include substances such as indium tin oxide (ITO), a conductive polymer such as poly(3,4-ethylenedioxythiophene) (PEDOT), or carbon nanotubes. The ground plane is meant to isolate the "smart layer" from underlying wiring board or flexprint components. In some embodiments, the first hardcoat layer may include materials having ground plane characteristics. In other embodiments, the ground plane may be a separate layer altogether. In yet further embodiments, the ground plane may be omitted. Such omission may be a result of minimal expected interaction between any optical or electromagnetic radiation from the underlying component board and the smart layer, or may arise from configurations that exploit such known or expected EM interactions to alter or otherwise affect or inform the operation of the smart layer and/or the underlying component board.

Embodiments of a smart layer may include signal conductors and/or active components sensitive to tamper or access attempts, key-storing materials or components for access control and tamper prevention, and/or masking or hiding materials or components to confuse or prevent non-destructive testing and/or analysis techniques. In alternate embodiments such a smart layer may be deposited directly onto an elastomeric softcoat without using a first layer of hardcoat. In some variations of such embodiments, the elastomeric coat may have ground-plane properties. In yet further variations, a ground plane layer may be disposed between the elastomeric coating and the smart layer. In yet further embodiments, multiple smart layers separated by intervening insulating layers (such as layers of frangible or plastic hardcoat) may be deposited. Embodiments of such insulating layers may include ground plane layers that electrically isolate the smart layers from each-other, or may include dielectric materials that alter the operating characteristics and interactions of two adjacent smart layers, or may include materials having non-preferred electromagnetic properties, allowing components from different smart layers to interact with each-other through their electromagnetic fields.

Embodiments of a smart layer may be connected to heat sinks and portions of a coated circuit board or component through vias in elastomeric and/or underlying hardcoat layers. In embodiments with multiple smart layers, different intervening insulating layers may have different vias and via structures to allow components or signal pathways from multiple smart layers to connect to each-other as well as to portions of a coated board or component. In yet further embodiments, heat-dissipating portions may be included in one or more smart layers. In further embodiments still, different portions of a smart layer or multiple smart layers may contain "spoofing" components, such as metallic or optically reflective shavings, heat sinks, decoy parts, or strategically-located active components or signal pathways, which prevent or confuse attempts to determine the structure and/or content of the protected component through non-destructive imaging or analysis techniques. In yet further embodiments, a ground plane or EM or optical shielding layer may also include "spoofing components" to make it seem like a smart layer or otherwise hide or confuse the true nature of any adjacent or underlying smart layers or board/flexprint components. An embodiment of an anti-tamper coating with multiple smart layers is depicted below:

In the embodiment depicted above, each smart layer is disposed on an insulating, frangible hardcoat layer equipped with component and/or thermal vias (not shown) that allow the components from differing smart layer to interconnect and/or connect to portions of a protected component or board, such as active components, signal pathways, or heat sinks. In some embodiments the insulating or hardcoat layers separating the smart layers, or portions of an individual insulating or hardcoat layer, may have different dielectric properties, thereby further varying the properties of components disposed above or below that layer or that layer portion. In further embodiments still, a smart layer may include noise-generating components such as heat sinks or radio-frequency antennas or inductors that may prevent or confuse non-destructive testing or analysis. In further embodiments, noise-generating components may be deliberately included in a secure hardware design such that suppression, alteration, or elimination of expected RF, IR, or other EM noise or radiation sources renders a protected component non-functional.

After one or more smart layers are deposited, a capping or top layer of hardcoat or other material may be applied to seal the components in the coating and create a tamper-sensitive surface. Embodiments may be configured such that pressure or damage to the capping layer causes it to break and thereby damage underlying smart layer components. Further embodiments may be configured such that the layer arrangement and materials selection allows for pressure or damage to a capping layer to be transmitted through all the smart layers, causing a cascade of breakage and/or damage that destroys or disables the functionality of a protected component.

In yet further embodiments, the top layer may include, be replaced by, or be supplemented with a ground plane layer, a dielectric material layer, and/or an electromagnetic shielding layer. Different embodiments may have some or all of these layers, or may include layers having multiple properties, such as an EM shielding layer that also acts as a ground plane and/or dielectric. Such a layer may be a capping layer or may be used in addition to a capping layer.

In some embodiments, a smart layer may be activated or "introduced" to the underlying component board/flexprint (and to any adjacent smart layers) by reading a "handshake" signal associated with a known current, voltage level, or other EM energy field applied to the layer. In some embodiments, the deposition process may be controlled with sufficient precision that a known or expected "handshake" is consistently produced and component parameters may be hard-coded in expectation of this handshake signal.

In other embodiments, a logic device such as an FPGA or ASIC may be included in the component board/flexprint or in one or more smart layers. In such embodiments, the logic device may have an initial executable program that generates and records a handshake signal between the smart layer and the underlying component board/flexprint and/or adjacent or associated smart layers to determine what the response of some or all of the coating is. In some embodiments, this executable program stores the detected response in a different part of the logic device, or in a separate storage component and then erases itself. In other embodiments, a logic device may be configured to run an embodiment of such an initialization/handshake program, store the detected handshake information in a separate portion of the coated board (such as in an on-board or smart layer memory device) and then burn itself out. In such burn-out embodiments, the details of the initialization program become unrecoverable, further improving the tamper-protection properties of the coating. In yet further embodiments, other processor types such as pure, logic-only designs configured specifically execute the handshake program and devoid of any internal or integrated data storage capability.

Embodiments of a deposition process for a coating as described herein may include nano-deposition, focused ion beam (FIB) deposition, laser sintering, low-temperature sintering (nano self-assembly), CAD/CAM driven deposition processes, and even biochemical-based self assembly processes. Embodiments of a CAD/CAM driven deposition process may include mathematical or algorithmic aspects that cause changes to a deposition pattern either according to a particular design sequence or as a result of permitted levels of random variation in some components or signal pathways. Such embodiments may allow for a unique configuration in each multi-layer coating, with the unique smart layer configurations being systematically created in a production-friendly manner.

One variation of a method of applying an anti-tamper coating to an component may include the steps of: first depositing a foundation layer such that first depositing creates or preserves thermal and component connection vias; second depositing a smart layer on top of the foundation layer, the smart layer including at least one active circuit component or signal pathway operably connected to the underlying component; and third depositing a frangible capping layer on top of the smart layer, where third depositing includes depositing the capping layer in a manner such that a breach of the capping layer causes physical damage to underlying smart layer components or signal pathways.

Some variations of the method may include depositing an elastomeric undercoat between the foundation layer and the underlying component such that depositing an elastomeric undercoat creates or preserves thermal and/or component connection vias. Further variations may include, as part of the second depositing step, depositing at least a second smart layer on top of the smart layer, the second smart layer including at least one active component or signal pathway operably connected to at least one of the active circuit component or signal pathway in the smart layer and the underlying component. Yet further variations may include depositing a ground plane layer between the foundation layer and the smart layer.

In some variations, the deposited capping layer may be an electromagnetic shielding layer. Further variations may include the step of depositing a ground plane between the smart layer and the capping layer. In yet further variations, the smart layer includes at least one of a memory component or a logic component and the method includes loading the memory component or said logic component with predetermined operating parameters. Further variations still may include the step of propagating data based on the predetermined operating parameters to other components in a smart layer. In yet further variations, the step of propagating may include burning out or erasing the logic or memory component such that the predetermined operating parameters and/or the data propagation scheme cannot be recovered.

Embodiments of tamper-evident and/or tamper-resistant coatings of the type discussed herein may be employed in a wide range of devices, including routers, game consoles, secure USB drives, PIN entry devices (i.e. credit card scanners, ATM machines, and similar devices employing access card/personal identification number combinations), hardware interfaces or controllers, code-bearing or programmable components in electronic devices such as hearing aids, mobile telephones, mp3 players, computers, solid-state storage devices, telecommunications hardware such as satellite or cable transmitters, relays and/or receivers (including television receivers, modems, telephones, etc.) or fiber-optic transmission, reception, routing and relay components, imaging or scanning devices, other optical, radio-frequency (RF) and/or magnetic signal/data generation, storage, transmission, reception, or modulation devices, and a wide range of other components or devices where tamper prevention and access control may be required.

Embodiments of tamper-evident and/or tamper-resistant coatings of the type discussed herein may be useful as latent security solutions that alter the signal pathways and operation of electronic devices without requiring that an electronic device or an associated sensor be active or activated during a tamper or intrusion attempt. Embodiments of a hardcoat may be highly frangible and configured to destroy embedded components when damaged. Embodiments of a hardcoat or an elastomeric coat may include patterns or components that are present only as distractions or obfuscations, making it more difficult to non-invasively detect any material-based key-storage components or non-invasively discern the structure and content of an underlying circuit component or board. Embodiments of an elastomeric undercoat may be configured to be easily strippable for coating replacement or maintenance/repair of the underlying component. Embodiments of a smart layer within a hardcoat or anti-tamper coating may contain multiple layers of inter-connected components. In some embodiments, a smart layer may be applied directly to an elastomeric undercoat or a first layer hardcoat disposed directly onto a component without an underlying undercoat.

Further scope of applicability of the present invention will become apparent from the detailed description given hereinafter. However, it should be understood that the detailed description and specific examples, while indicating preferred variations of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 1a-1d are representational diagrams of an embodiment of a coating build-up sequence and the layers of a coating embodiment;

FIG. 2 is a representational diagram of an embodiment of component layers within an embodiment of a coating described herein;

FIG. 3a is a representational diagram of an embodiment of a multi-layer coating embodiment;

FIG. 3b is a representational diagram of an embodiment of a multi-layer coating embodiment;

FIG. 3c is a representational diagram of an embodiment of a multi-layer coating embodiment;

FIG. 3d is a representational diagram of an embodiment of a multi-layer coating embodiment;

FIG. 3f is a representational diagram of an embodiment of a multi-layer coating embodiment;

FIG. 3g is a representational diagram of an embodiment of a multi-layer coating embodiment;

FIG. 4 is a flowchart showing an embodiment of a coating application sequence;

FIG. 5 is a flowchart showing an embodiment of a coating application sequence.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Anti-tamper techniques and reverse-engineering prevention solutions are a mainstay of securing and preventing unauthorized use and duplication of technologies. This is especially relevant for makers of customized, specialized or otherwise sensitive electronic, electro-optical, or electro-mechanical devices where physical properties and/or specific component designs play key roles in the effective operation of the device. Devices such as transponders having unique frequency responses based on the size, shape, configurable parameters, and/or composition of internal antennas/resonators, circuits performing various forms of data encoding, information storage devices, programmable and/or hard-coded logic devices, and/or any information-bearing components such as those found in game consoles, network cards, mobile phones, portable memory devices, and/or other computing devices which enable information access, data exchange, or component/user identification would benefit significantly from the use of anti-tamper solutions.

The anti-tamper solutions discussed herein pertain to multi-layer coatings containing embedded signal pathways and/or embedded components that connect to or otherwise interact with portions of the coated device and/or with signal I/O pathways to and from the coated device. Embodiments of such coatings may include one or more component/pathway bearing layers contained between frangible hardcoat layers, protective shell coatings, and/or electrical isolation layers. Further embodiments may include imaging prevention layers such as layers of metal shavings or ground planes to impede or prevent the use of non-destructive imaging techniques that may replace or assist in tamper attempts. Yet further embodiments may include one or more elastomeric coatings that may permit removal and replacement of a multi-layer coating in order to enable the use of multiple coating types on the same device depending on particular applications, and also to enable repair of underlying components instead of requiring wholesale device replacement on component failure.

Embodiments of such coatings may be built up through the deposition of successive coating layers onto a substrate device. An embodiment of a layer build-up process, and the attendant layer types and variations, is shown in FIGS. 1a-1d.

Figure 1A:
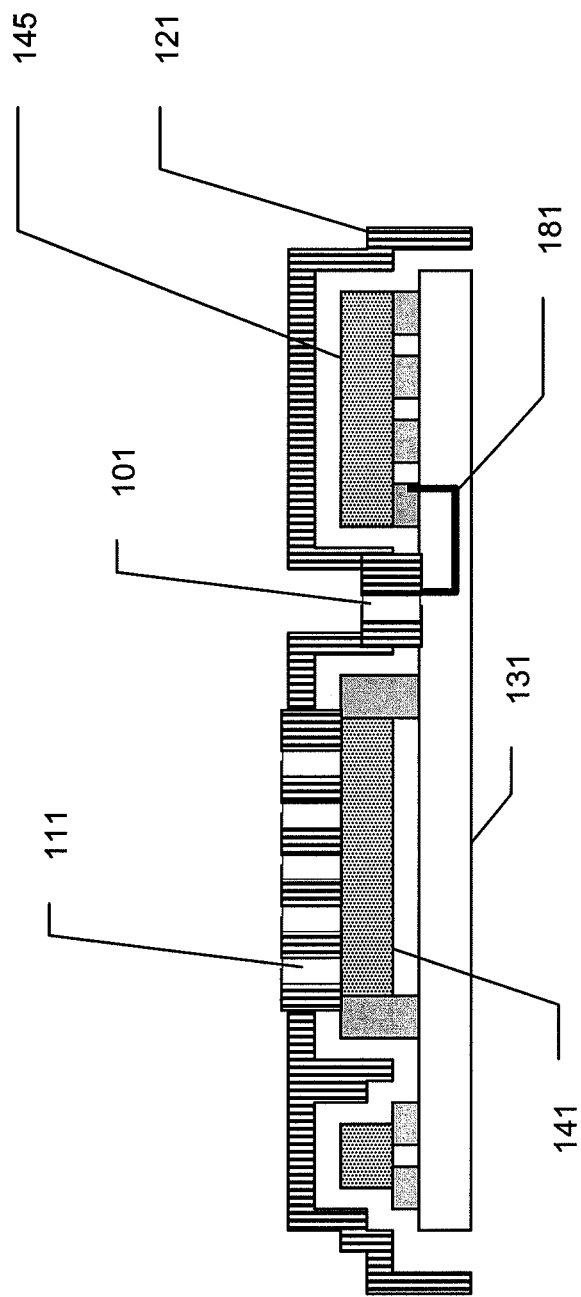

In FIG. 1a, an embodiment of an electronic device 131 having various components 141 is depicted. Alternate embodiments may include mechanical, optical, electro-mechanical, electro-optical devices and/or components, electro-mechanical devices and/or, or other EM-pathway based componentry. In the embodiment shown, an initial coating material is applied to create the first coating layer 121. In some embodiments, the first coating layer may include an elastomeric or passivating layer that may be easily removed from the underlying device 131 (along with any coating layers later deposited thereon). In other embodiments, the first coating layer 121 may have thermal or mechanical compensation properties that mitigate or otherwise control any mismatch between a coefficient of thermal expansion (CTE) of the device 131 or specific components 141 thereon and any subsequently-applied layers and/or components/signal pathways therein. In other embodiments, a first coating layer 121 may be a non-removable layer that is either elastomeric or frangible. Such a layer maybe used to insulate the electrical components from subsequent processing, which may otherwise cause electrical shorting, interference or perturbation of the underlying components or functionality, or other undesired effects to the system or components thereof. Embodiments of a frangible layer may be used to create short-circuits or other signal-transmission or mechanical operation variations in the device 131, a component therein 141, or components or signal paths in subsequently-applied layers (not shown) or some combination thereof, as a result of a tamper event.

Possible materials and material combinations for an elastomeric and/or passivating first layer may include elastomer, silicone, latex, rubber, or other suitable passivating material which may allow for easy removal of the coating. In the case were removability is not desired, passivation layers may include urethane, acrylic, parylene, glass, ceramic, or other suitable material which provides insulation from subsequent layers. Variations of a deposition process for an elastomeric or passivating layer may include spraying, dispensing, powdercoating, laminating, painting, vapor deposition, flame spray, direct-write, or submerging the component(s) in a desired material. Further variations of a first, removable layer may include directly written silicone or room-temperature vulcanization (RTV) elastomer. Further variations may include acrylic, parylene, kraton, noryl, etc. Preferably the first layer has electrically insulating properties such that any subsequently applied components or signal paths do not interact with the coated components in ways other than those intended/specified during non-tampered operation.

For variations using a pliable material such as silicone, elastomer, resin, latex, rubber, or plastic, a variation of a deposition process may include applying a viscous or partially liquid form of a suitable material that may then subsequently cure or dry into a solid, flexible coating. Other variations may include applying high-dielectric, semi-solid gels that remain viscous or are otherwise non-curing. Yet other variations may include applying a granular, solid coating that may then be treated with heat and/or solvents to form a continuous insulating layer. Further variations still may include using an epoxy or coating or adhesive whose adhesion and/or flexibility properties may be altered by applying a current or voltage to it.

During deposition or application of the first layer 121, some variations may leave gaps in the coating to create thermal vias 111 and interconnect vias 101 through subsequent fill with thermally conductive material. The thermal vias 111 may be used to connect coated components to heat sinks or other thermally dissipative components. The interconnect vias 101 may be used to connect one or more components 145 to signal paths and/or components in later-applied coating layers (not shown) via one or more device conduction paths 181 that may either be created specifically for such a purpose, or that may already exist on the device for other purposes as well as serving as interconnect point(s).

Prior to deposition of the first layer 121, the device 131 may be subjected to plasma treatment to change the adhesive properties of its surface and the surfaces of its associated components 141, 145. Such plasma treatment may be employed to either increase or decrease the surface adhesion depending on whether the first layer is meant to be removable or not. In some variations where a permanent or otherwise not readily removable passivation layer has already been applied, only a removable/strippable elastomeric layer 121 may be required. Variations of such a strippable elastomer could be peeled away from the substrate to enable servicing and/or maintenance. Examples of a non-removable passivation layer suitable for such a variation may include urethane, parylene, and acrylic.

Figure 1B:
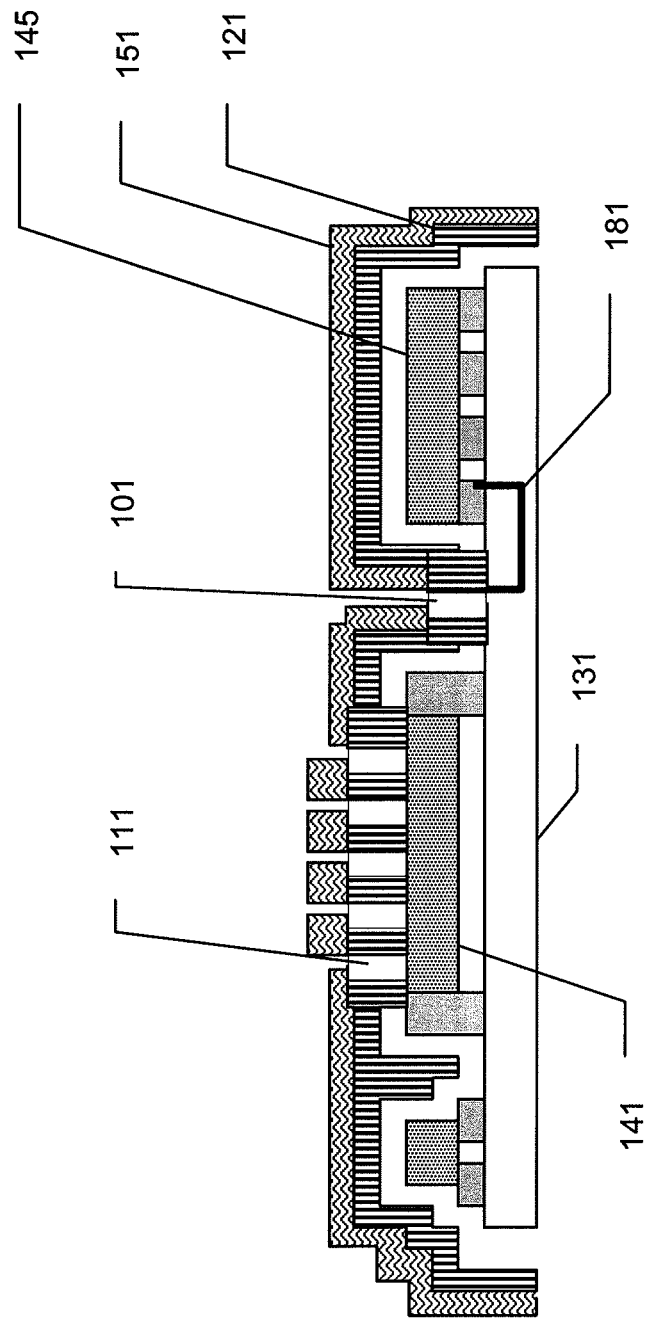

After a first layer has been applied, an embodiment of the coated device may then be further processed such that a hardcoat or component substrate layer 151 may be applied thereon. Such a step and embodiment is depicted in FIG. 1b The hardcoat layer 151 may include materials that cure to glass-like consistency (sodium silicate), ceramic consistency, or other frangible material consistency. Commercial products exhibiting such properties include Liquid Glass and even Bondo; products such as these may be applied using techniques similar to those discussed for the first layer 121. In some variations, prior to applying the hardcoat layer 151, the first layer 121 may be subjected to plasma treatment in order to increase its surface adhesion such that the hardcoat layer 151 adheres more strongly to the first layer 121, thereby preventing or reducing instances of coating failure as a result of layer separation.

In variations where the first layer 121 is an elastomeric or otherwise removable layer with electrically insulating properties, the hardcoat 151 may be frangible such that pressure or other mechanical force exerted thereon may cause disruption or damage to later-applied layers, including layers bearing signal pathways and/or components. In further variations, the component substrate layer 151 may be a composite or multi-function layer that includes a hardcoat and a ground plane, or a layer that has both hardcoat and ground plane properties. Variations of a hardcoat may include embedded booby-traps such as deposited springs or levers or piezo materials that cause the hardcoat to self-crack if a tamper is detected through other means. Alternatively the hardcoat may contain energetic material to further increase the impact of a tamper detect through conflagration or ignition of said energetic material. Variations of a ground plane may include an electrically conductive mesh or grid, metallization, and dielectric layers such as urethane, parylene, or acrylic. In some variations of a composite component-bearing layer 151, a hardcoat layer of the type discussed above may be deposited onto a first elastomeric layer 121 and a ground plane, such as a wire mesh or metallization layer, may be deposited underneath the hardcoat to create a composite component-bearing layer 151. In other variations, a frangible hardcoat layer 151 may have ground plane properties by virtue of being electrically conductive or by having electrically conductive portions included or embedded therein. In the composite and multi-function variations, fracture of the hardcoat layer 151 may also cause breaks in the ground plane, allowing for otherwise undesirable component interactions between device components 141 and later-applied components and conduction paths, rendering the coated device partially or wholly inoperable or otherwise impairing its function as a result of a tamper event. In some variations, compromising a ground plane portion of the component substrate layer 151 may lead to loss or destruction of data stored in a device component 141 or in later-applied components or conduction paths. In variations where the first layer 121 is either non-removable or non-flexible, the component substrate layer 151 may be a hardcoat disposed over a ground plane layer or a multi-function hardcoat with ground plane capabilities as discussed above.

Embodiments of a ground plane aspect of the component substrate layer 151 may include an electrically conductive portion or coating applied onto either the elastomeric/passivating layer 121 or onto a hardcoat layer used as the first layer 151 or as part of a composite component substrate layer 151. Variations of an electrically conductive portion may include a wire mesh, plated metallizations (created, in some variations, with an electrolytic or electroless plating process), printed electrically-conductive inks or pastes, dispensed metallic or metal-bearing substances, including those printable metal-bearing materials that require subsequent sintering via oven or laser, conductive foils or films, or other suitable conductive materials that provide ground plane functionality. In a multi-function coating embodiment, the aforementioned examples of hardcoat material may be dispensed such that it surrounds a conductive material core which is electrically isolated from any later-applied components, where the conductive core serves as a ground plane. In a composite coating embodiment, a ground plane material may be applied directly onto the first layer 121, with an electrically insulating hardcoat material disposed on top of the ground plane material. In an alternative composite coating embodiment, a ground plane material "sandwich" may be created by depositing a first hardcoat material, then a ground plane material, and then a second hardcoat material on top of the ground plane. Variations of a ground plane may be connected to grounded access points or backshells of connectors or similar connection points on the protected device 131.

Figure 1C:
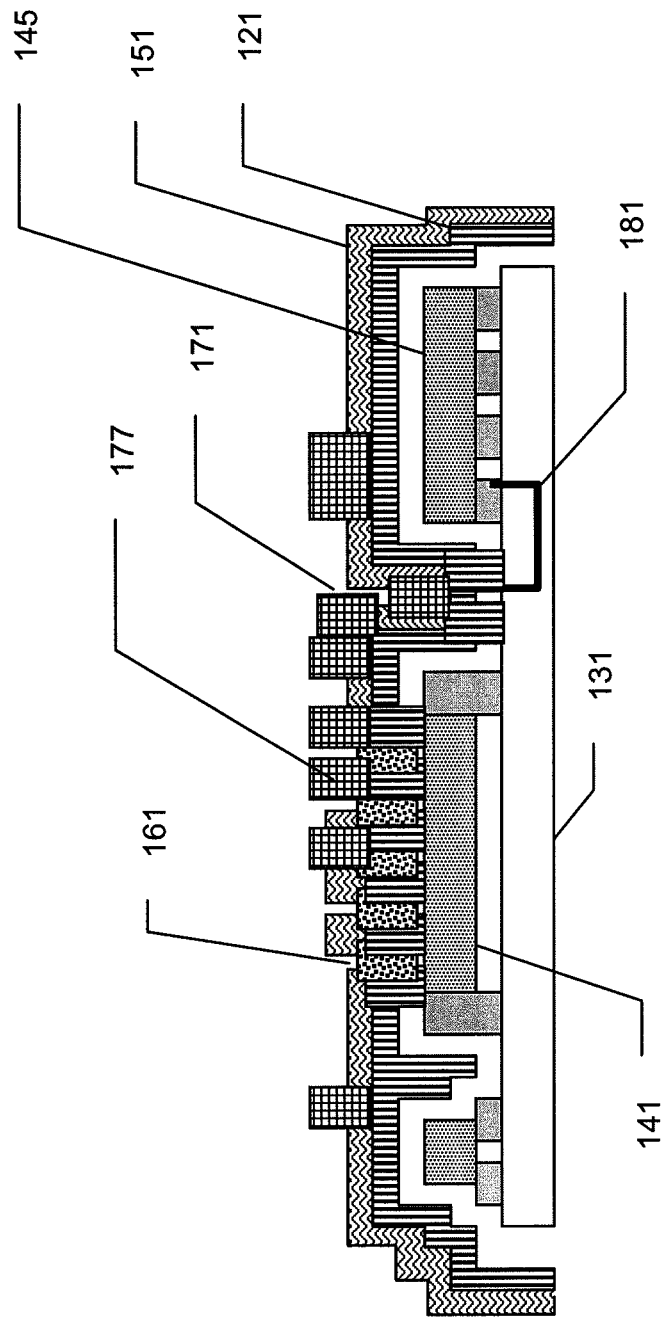

After a component substrate layer 151 has been applied, the thermal vias 111 conductive vias 101 may be filled and a conductive path and/or component bearing layer may be applied. Such and step and embodiment is depicted in FIG. 1c. In the embodiment shown, thermal vias 161 are filled with silver or other metal-bearing epoxy, sintered metal, or properly aligned nanotubes, which enables heat to be transferred away from a coated component 141. Conductive vias 171 are filled with materials similar to those used in the thermal vias. The conductive vias 171 enable a coated component 145 to exchange signals with conduction paths and/or layer components 177 applied onto the component substrate layer 151 along device conduction paths 181 that connect to the vias 171.

Embodiments of conduction paths and/or layer components may include wires, plated signal paths (created, in some variations, with an electrolytic or electroless plating process), printed electrically-conductive inks, dispensed metallic or metal-bearing substances, including those printable metal-bearing materials that require subsequent sintering via oven or laser, pre-made active or passive components, optical signal paths and/or components, or mechanical/electro-mechanical components. Variations of components or component assemblies may include antennas, inductors, capacitors, resistors, transistors, transistor arrays, operational amplifiers, semiconductor devices, switches, switch arrays, multi-layered component assemblies, resonators, oscillators, and impedance matching devices. Discrete components such as small microcontrollers or microprocessors may also be placed and electrically connected into the coating system. Additional coating-level computation could occur by placing and connecting the components that make up a circuit capable of decision-making. Electro-mechanical components and component assemblies may include actuators or piezo-electric devices. Variations of layer components or conduction paths 171 may be connected to access points or connectors or similar connection points 181 associated with the protected electrical component(s) 145.

After conduction paths and/or layer components 177 have been deposited, subsequent layers of electrically insulating materials (such as hardcoats or hardcoat/ground plane/hardcoat layers) may be applied, and additional conduction paths or layer components (not shown) may be applied thereon. Such variations may be useful for multi-layered component assemblies where one or more of the conduction path layers 171 include components that interact with components or conduction paths in other component layers or with underlying components 145.

Yet further variations may include additional layers either between an insulating or ground plane layer and an electrically conductive layer or on top of an electrically conductive layer. Variations of such layers may act as additional insulating layer(s). Such layers may provide mechanical support/rigidity, corrosion resistance, additional electrical functionality, tamper prevention, CTE mismatch compensation, RF-shielding, heat management, waterproofing, corrosion resistance, noise generation, noise reduction, or a wide range of other possible functions/features. In one variation, a silicone electrically insulating layer may provide electrical insulation and waterproofing and corrosion resistance. In another variation, a "spoofing" layer may provide components and signal paths not connected to other components or signal paths or otherwise made to conceal the true function or design of the components in the coating or the device. In yet other variations, an imaging prevention layer may be embedded with "spoofing" components, reflective shards/objects, or difficult-to-penetrate materials to prevent or complicate attempts at one or more of optical, RF, ultrasonic, SEM, infra-red, ultra-violet, millimeter-wave, x-ray, or other form of scanning. In yet other variations materials such as urethane, polystyrene, santoprene, and EPDM rubber may be employed for environmental protection.

Variations of a component-bearing layer 177 may be capped or otherwise covered by a capping layer or layers which may be an environmentally protective layer, a structural rigidity layer, a frangible hardcoat, an RF shielding layer, an imaging prevention layer, a ground plane layer, or a combination thereof. Such a step and embodiment is depicted in FIG. 1d. In the embodiment shown, a capping layer 191 is applied onto a component-bearing layer 177. Such a capping layer may include a frangible hardcoat that will cause damage to underlying components or conduction paths in the component-bearing layer 177 and also possibly cause damage to underlying hardcoat and ground plane layers 151 as a result of a tamper attempt. Variations of a capping layer may also include a ground plane that electrically isolates components in the component-bearing layer(s) 177 such that outside EM or RF interference does not affect their operation. Yet further variations of a capping layer may include an environmental sealing material that provides waterproofing, atmospheric sealing, corrosion resistance, or other forms of protection from a potentially hostile operating environment. Further variations still may include "spoofing" and/or scanning-prevention measures of the type discussed above.

Removable/strippable variations of the overall multi-layer coating are preferably made of flexible and/or readily deformable materials such that a technician may easily strip the coating for servicing and maintenance of the underlying device 131 and components 141, 145, or for replacement of the coating with an alternate coating suited or designed for a particular operating environment or situation. Preferably, the frangible aspects of a strippable coating render the coating inoperable or otherwise useless upon removal due to fracturing and attendant damage of components and conduction pathways in the coating.

Variations of a component-bearing layer may include a single layer of components and signal pathways, or may include multiple levels of interacting/interconnected components. Some multi-level variations may include "fake" or "spoofing" components/pathways designed to confuse and prevent scanning or tampering attempts or otherwise prevent attempts to ascertain the "real" or "functional" aspects of the component bearing layer and its internal interactions as well as interactions with underlying device components. An example of a multi-level component-bearing layer is depicted in FIG. 2.

In the embodiment shown, the component-bearing layer has four levels 201, 211, 221, 231. The levels may include components such as transistors 271, amplifiers 291, resistors, capacitors and interconnects 241 that connect components from one level 251 to components on another level 261. Some layers may also have grounded connection points 281 for one or more components. Variations may have more or fewer layers, and components in some layers, such as switching networks 271, may be included for purposes of misleading or otherwise concealing the true nature of associated or underlying components. In yet further variations, a level may include a ground plane or a noise-generating aspect such as metal shavings, optically reflective granules, or magnetic substances. Yet further variations may include components designed to break or otherwise cause damage upon a tampering event. In the variation shown, an area in one of the levels 211 is a packed of conductive ink 298 encased in a frangible bubble such that the bubble will burst if pressure is applied thereto, allowing the ink to spread to nearby components and cause them to short out. In other variations, piezo-electric substances could be disposed in a level such that voltage or current generated in response to physical deformation shorts out or otherwise overloads connected or nearby components or conduction paths. In yet further variations, conductors may be positioned on a substrate with plastic deformation properties such that an intrusion or tamper event deforms the substrate and thereby alters the conduction path in a manner that impairs, alters, or prevents operation of the coating or coated components.

Embodiments of a single-level or multi-level component bearing layer may be included in an anti-tamper coating in several ways. In one embodiment, a component-bearing layer may be isolated from components in an underlying device through a ground plane or similar structure that prevents electromagnetic interference between the coated components and the components in the component-bearing layer. Such an embodiment is depicted in FIG. 3a. In the embodiment shown, an elastomeric or otherwise strippable layer 351-1 may be deposited onto an underlying device (not shown). A ground plane 341-1 or similar electromagnetic shield may then be disposed onto or otherwise included with the strippable layer 351-1. Such a ground plane 341-1 protects a component-bearing layer 331-1 from generating or being affected by interference between the components 321, 311 and coated portions of the underlying device (not shown). In some embodiments, the ground plane 341-1 may be separated from the component-bearing layer 331-1 by one or more layers of dielectric material. In other embodiments, the component-bearing layer may itself be a dielectric that separates the components 321, 311 from the ground plane 341-1. In some embodiments, the ground plane 341-1 may be frangible or otherwise configured to break due to a tamper event such that the components 321, 311 and the underlying device (not shown) are no longer shielded from each other and therefore cease operating properly. In some variations, another ground plane 301 may be disposed on above the component-bearing layer 331-1 to prevent interference from outside sources. In further variations, the top ground plane 301 may also be a shielding layer meant to prevent or reduce the effect of outside electromagnetic noise and/or prevent or otherwise impede imaging efforts using electro-optical radiation. In further variations, ground planes, EM shielding, and/or imaging prevention layers 301 may be disposed between component-bearing layers or levels of a component-bearing layer. Such a variation is depicted in FIG. 3b.

FIG. 3b shows a variation where levels of a component-bearing layer 333-1, 333-2, or multiple component-bearing layers, may be separated by a ground plane or other EM shielding layer 361 to isolate the components of one level (or layer) from those of the other level (or layer). In some variations, the ground plane 361 may be frangible or otherwise designed to fail due to a tamper event such that it allows electromagnetic interference to occur between the first component-bearing layer 331-2 and the second component-bearing layer 331-1. In other variations, the ground plane may be designed to cause unwanted electrical connections between the layers or otherwise damage the signal or conduction pathways of one or more component-bearing layers or levels, rendering the coating (and thereby the underlying device or component) incapable of proper operation. In yet further variations, the ground plane layer may upper and lower coatings of dielectric material that serve as substrates for the component-bearing layers. Such a variation is shown in FIG. 3c.

In the variation shown, a first component-bearing layer 331-1 may have a dielectric material coating 341-3 that may also be a frangible hardcoat or other tamper-sensitive material, or that may be an imaging-prevention layer, that separates the component-bearing layer 331-1 from a ground plane 351-2. Another dielectric material layer 341-2 that may also be frangible hardcoat, imaging-prevention material, or other tamper-sensitive material may be disposed between the ground plane layer 351-2 and a component-bearing layer 331-2. In some variations, the dielectric material layer 341-2 may be a substrate on which the components of the component-bearing layer 331-2 are printed or otherwise disposed. In further variations, a ground plane with an underlying dielectric or insulating layer may be disposed as part of a capping or covering portion of an anti-tamper coating. Such a variation is shown in FIG. 3d.

Figure 3E:
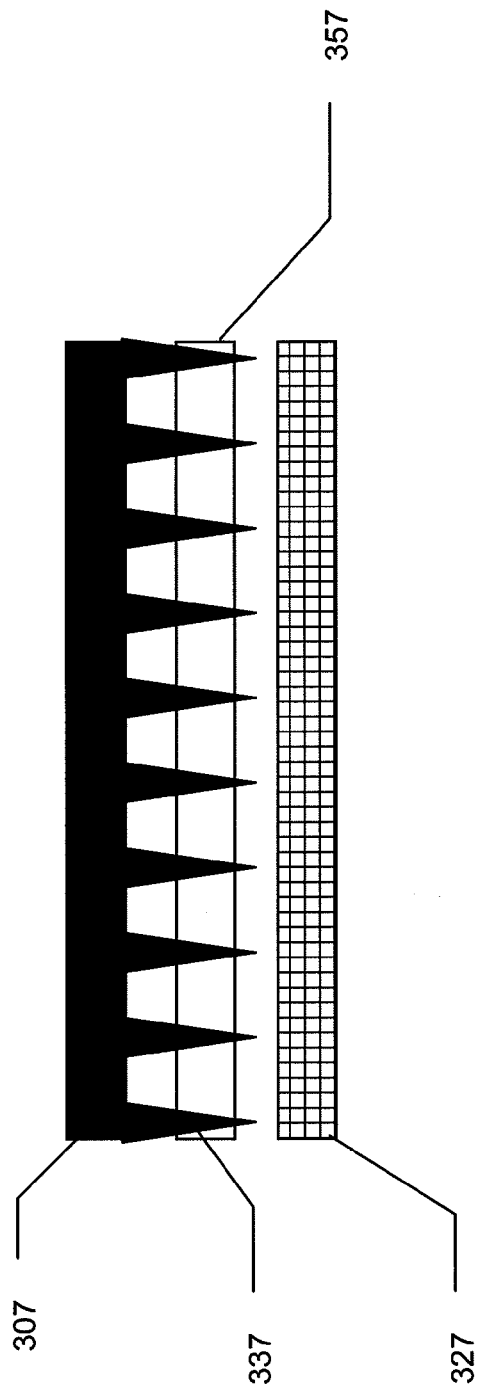
FIG. 3e is a representational diagram of an embodiment of a multi-layer coating embodiment.

In the variation shown, an underlying device 359 may be coated with a strippable elastomeric layer 369 and a ground plane 349 that sit between the device 359 and a component-bearing layer 339. Other layers or layer components may be included beneath the component-bearing layer 329, which may be a dielectric material separating the components 329, 319 from the ground plane 349. In some variations, imaging-prevention, additional ground plane, additional dielectric, structural rigidity, frangible hardcoat, and/or underlying component-bearing layers may be included in the layer stack below the component bearing layer 339. As part of a cap or covering, a ground plane layer 309 may be disposed on top of a dielectric or electrically insulating layer 379 that separates the components 319, 329 from the upper ground plane 309. Such a ground plane 309 may be part of an imaging-prevention and/or environmental protection cap. In some variations, a ground plane may contain spikes or protruding elements. Such a variation is shown in FIG. 3e.

In the variation shown, the ground plane 307 contains protruding elements 337 that extend into a frangible or otherwise easily deformable dielectric or insulating layer 357. During a tamper event, the protruding elements 337 will penetrate the insulating layer 357 and create unwanted electrical contacts in a component bearing layer 327 or in conduction paths of an underlying device or component. Other variations may have a ground plane of variable or uneven thickness associated with a frangible, fluid, or otherwise readily deformable insulating or underlying layer to cause damage to a component-bearing layer by creating unwanted electrical connections. Yet other variations may have such contact-producing ground planes disposed between component-bearing layers or levels of a multi-level component-bearing layer to render a coating and/or coated device inoperable or otherwise unusable or inaccessible as a result of a tamper event. In some variations, a contact-producing layer may be associated with reservoirs of conductive or corrosive material that may be punctured on contact to cause further and/or more significant disruption in operation or, in some variations, to prevent post-tamper analysis for reverse engineering purposes. In some variations, some component-bearing layer components, such as "spoofing" or otherwise inactive components, may be configured to cause other components to burn out in the event of tamper-driven electrical contact.

In another variation, shown in FIG. 3f, a component-bearing layer 355 disposed between an underlying component 325 and an overlaid hardcoat, cover, or ground plane 305, may include variable impedance components 335 where deformation of or pressure upon the coating shape will cause changes in the signal output of a variable impedance component 335. Further variations may include variable capacitance or variable inductance devices that vary signal output based on either or both of physical deformation and electro-magnetic field variations (such as those detected by induction- or capacitance-based sensors). Changes in the signal output may trigger other smart layer component or on-board components of tamper or intrusion attempt and cause one or more portions of the coating or coated component to cease or alter its function. In some variations the variable resistance component 335 may be configured for plastic deformation, making its initial size and shape difficult to restore/recover without causing further damage to the coating. Some variations may employ wheatstone bridges whereas others may use piezo-electric components, variable inductance components, variable capacitance components, or deformable signal paths associated with techniques such as time-domain reflectometry (TDR) to accomplish similar results.

In yet another variation, shown in FIG. 3g, a layer having spring-like components 333 is disposed in a frangible hardcoat 353 between a component-bearing layer 303 and a ground plane 323. Physical pressure caused by a tamper attempt may trigger the springs, causing them to break the hardcoat and, in some cases, penetrate the ground plane 323 and/or the component-bearing layer 303. This may lead to component damage or electro-magnetic radiation leakage/interference that will impair operation of the component-bearing layer and therefore interfere with proper operation of a coated device or component. In some variations, the spring-like elements may also include levers or similar mechanical devices. In further variations, the spring-like elements 333 may be conductive and may therefore cause short-circuits by penetrating a component-bearing layer or connecting smart-layer components to ground plane areas or other components in a smart layer or on the underlying board/device. In yet further variations, the spring like elements may be highly reflective or otherwise made of materials that impede or prevent imaging of any devices or components covered by the spring-like elements. In some variations, the spring-like elements may include depleted uranium shavings and/or lead to prevent or impede imaging techniques such as x-ray analysis.

Variations of an anti-tamper coating as discussed above may be created/applied in several ways. One variation of a coating creation process is depicted in FIG. 4. In the variation shown, the process begins by determining whether a conformal coating is to be applied underneath the secure coating 401. If a conformal coating is required, connectors and board areas are masked 401 and then such a coating is applied 411. Embodiments of a conformal coating may include rigid preforms or plates with embedded pathways. After the coating is applied, the masks may be removed 417. In some variations using techniques such as direct-write deposition for the conformal coating, the mask application and removal steps may be omitted.

If a conformal coating is not required, the process moves on to a determination of whether a removable coating is desired 421. If a removable coating is desired, the component or underlying conformal coating is plasma treated 427 to reduce surface adhesion, and then an elastomeric or other flexible, strippable coating is applied 431. Variations of a strippable coating may be applied via direct-write deposition, screen printing, or by applying adhesive films with the necessary layer buildup already in place. In variations having an underlying conformal layer, the strippable portion of the coating may have a ground plane component or ground plane properties. After deposition of a strippable coating 341, the coating may then be plasma treated 437 to increase its surface adhesion properties. In variations using specialized materials or material combinations, one or more of the plasma treatment steps may be omitted due to the natural adhesive or non-adhesive properties of the strippable material employed.

Either after the strippable portion has been deposited 431 and plasma treated 437 or, for non-strippable variations, instead of a strippable portion, a frangible hardcoat portion is deposited 441. In some variations, deposition of the hardcoat 441 may commence with plasma treatment of the strippable portion to increase its surface adhesion 437. Such measures help prevent separation of coating layers during operation/use. Variations of a hardcoat may include those mentioned earlier. Further variations may include a ground plane aspect or ground plane properties in the hardcoat material. A ground plane portion may be included in the material composition of the hardcoat layer or may be applied as part of the hardcoat deposition process 441. In some variations, a ground plane may be a metallization layer applied by plating, sputtering, screen-printing of metal-bearing inks, vapor deposition, and/or sintering of metal powders. Variations of a hardcoat may also include dielectric materials applied above or around a ground plane material, or applied without regard for a ground plane material. Such dielectrics may be applied via direct-write deposition, screen printing, vapor deposition, and/or metal sintering.

After the hardcoat portion is applied 441, vias created or left during the first hardcoat application process may be filled in 447 and one or more component-bearing and/or conduction-path-bearing layers may be deposited 447. Variations of such "smart" layers may include single or multi-level layers with one or more electronic components, signal paths, "spoofing" portions, noise-generating areas, imaging prevention portions, and/or other active or passive components. Some variations of smart layer deposition 481 may include depositing a layer of dielectric or insulating material followed by component/signal path deposition. Yet further variations of smart layer deposition 447 may include a step of depositing a dielectric or insulating material on top of or after the deposition of the component or signal-path-bearing layer. After a smart layer has been deposited, a second hardcoat layer may be deposited 451 onto the smart layer. In some variations, the second hardcoat may include a ground plane portion or material having ground plane characteristics. In other variations, the second hardcoat may include a dielectric material deposited underneath or in place of or in addition to a ground plane portion. In some variations, a check may then be performed to determine if another smart layer is required (not shown). If another smart layer is required, the smart layer deposition process 447 and second hardcoat deposition process 451 may repeat until no further smart layers are needed. Once the smart layer and second hardcoat deposition processes are complete, a check is performed to determine if a conformal cover is required 457. If no conformal cover is required, the deposition process ends and the coating is complete. If a conformal cover is required, a conformal cover deposition process is initiated. Variations of a conformal cover deposition process may include masking any connectors or other exposed areas 461, depositing one or more of a ground plane, capping layer, environmental protective layer, imaging prevention layer, structural rigidity layer, or insulating/dielectric layer 461, and then removing any applied masks 471. Deposition techniques may include direct-write deposition, screen printing, vapor deposition, and/or metal sintering. In some variations using direct-write techniques, the mask application and removal steps may be omitted.

In some variations of a deposition process, plasma treatment and ground plane creation steps may be specifically identified. Such a variation is shown in FIG. 5. Prior to depositing material onto a component, a check is performed to determine if surface plasma treatment is required 509. If surface plasma treatment is required, the component is plasma treated 519 to either increase or decrease its surface adhesion as desired. If no plasma treatment is necessary, the process proceeds directly to deposition of an elastomeric or other flexible insulating layer 529. After this layer is deposited, another check is performed to determine if plasma treatment is required to alter the surface adhesion characteristics of the elastomeric layer 549. If plasma treatment is required, the layer is plasma treated 549 before checking whether a ground plane is necessary 569. If a ground plane is required prior to depositing components or a component-bearing layer 589 onto the elastomeric layer, the ground plane deposition process 579 may be performed by direct-write deposition, screen printing, vapor deposition, and/or metal sintering. Then, after the component-bearing layer is deposited, further layers may be deposited thereon 599 which may include a capping layer 599-1 that completes and seals the coating.

Figure 6:
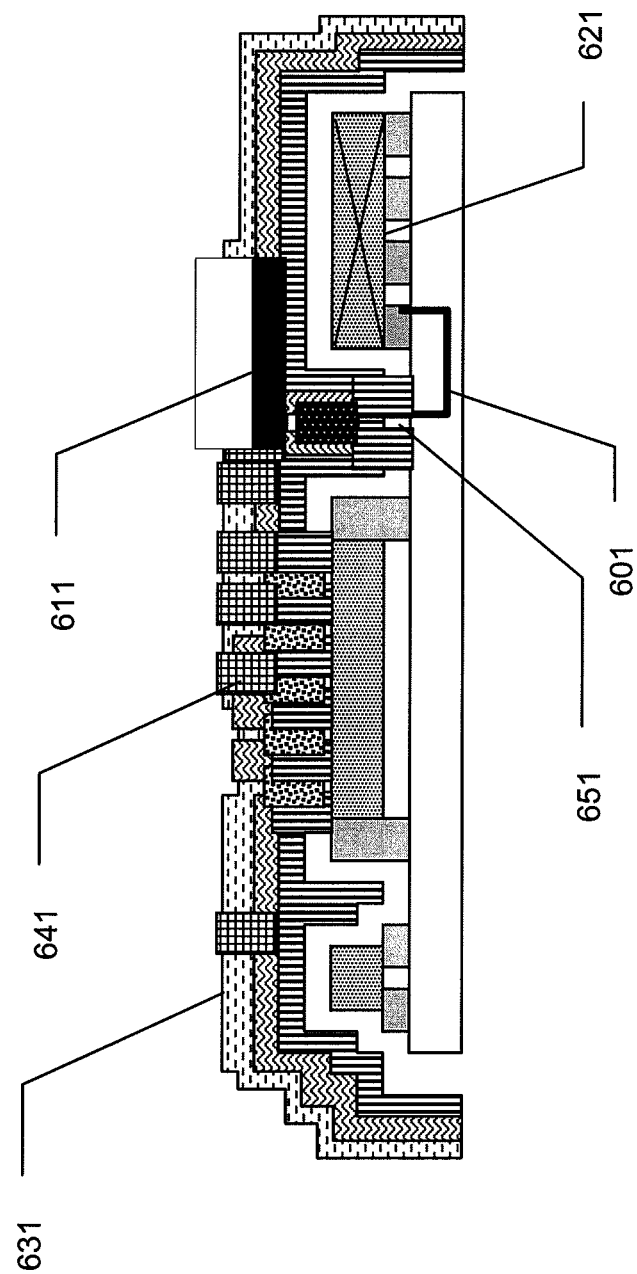
FIG. 6 is a representational diagram of an embodiment of a coated component after experiencing a tamper or intrusion event.

Once the coating has been applied to the component, it serves to detect and respond to tamper or other intrusion events by, in some variations, altering or inhibiting the operation of the coated component. One such variation is shown in FIG. 6. The variation shown employs a coating with a frangible hardcoat layer 631 disposed over a component-bearing layer 641 that is connected to an signal path 601 of an on-board component 621 through a connection via 651. In the variation shown, a tamper event has damaged the coating in the region of the connection via 611. This damage has altered the operation of the component-bearing layer such that the on-board component 621 is no longer able to interact properly with the layer-level components 641. The on-board component 621 is therefore no longer operating correctly, rendering the device either wholly or partially inoperable. In such instances, the coated device would have to be either returned to a maintenance/fabrication site for application of a new coating, or destroyed and replaced due to irreparable damage caused as a result of the tamper event.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. An anti-tamper coating for a component, the coating comprising:
   a foundation layer that includes a thermal via and a component connection via, the foundation layer being disposed on the component;
   a smart layer disposed on top of the foundation layer, the smart layer including an active circuit component operably connected to the component through the component connection via;
   a capping layer disposed on top of the smart layer and equipped with a frangible portion such that a tamper attempt breaks the frangible portion, thereby causing physical damage to the active circuit component;
   where the active circuit component in the smart layer includes at least one of a logic device and a memory device.

2. The coating of claim 1, where the foundation layer includes an elastomeric undercoat and where the elastomeric undercoat includes at least one of a thermal via and a component connection via.

3. The coating of claim 1, where the smart layer includes at least two sub-layers, each sub-layer including at least one active circuit component operably connected to at least one of the active circuit component or a signal pathway in the other sub-layer.

4. The coating of claim 1, where the foundation layer includes a frangible portion such that breakage of the frangible portion causes disruptive or destructive interactions between the active circuit component and the coated component.

5. The coating of claim 1, further including a ground plane layer disposed between the foundation layer and the smart layer.

6. The coating of claim 1, wherein the capping layer includes an electromagnetic shielding portion.

7. The coating of claim 1, further including a ground plane disposed between the smart layer and the capping layer.

8. The coating of claim 1, the coating further comprising a first ground plane disposed between the smart layer and the foundation layer and a second ground plane disposed on top of the smart layer.

9. The coating of claim 8, the coating further comprising a second smart layer disposed between the second ground plane and the capping layer.

10. The coating of claim 1, where the capping layer includes a frangible portion, the frangible portion including damage-causing elements such that breaking the frangible portion causes the damage-causing elements to physically interact with the smart layer.

11. The coating of claim 5, where the foundation layer includes an elastomeric undercoat and where the elastomeric undercoat includes at least one of a thermal via and a component connection via.

12. The coating of claim 5, where the smart layer includes at least two sub-layers, each sub-layer including at least one active circuit component operably connected to at least one of the active circuit component or a signal pathway in the other sub-layer.

13. The coating of claim 5, where the foundation layer includes a frangible portion such that breakage of the frangible portion causes disruptive or destructive interactions between the active circuit component and the coated component.

14. The coating of claim 5, where the capping layer includes a frangible portion, the frangible portion including damage-causing elements such that breaking the frangible portion causes the damage-causing elements to physically interact with the smart layer.

15. The coating of claim 5, wherein the capping layer includes an electromagnetic shielding portion.

16. The coating of claim 5, further including a ground plane disposed between the smart layer and the capping layer.

17. The coating of claim 5, where the active circuit component includes at least one of a logic device and a memory device.

18. The coating of claim 5, the coating further comprising a second ground plane disposed on top of the smart layer.

19. The coating of claim 18, the coating further comprising a second smart layer disposed between the second ground plane and the capping layer.

20. The coating of claim 5, where the ground plane includes damage-causing elements contained in the ground plane and configured such that a tamper event causes the damage-causing elements to physically interact with the smart layer.

\* \* \* \* \*